United States Patent
Keni

(10) Patent No.: US 7,779,022 B2
(45) Date of Patent: Aug. 17, 2010

(54) EFFICIENT RETRIEVAL AND STORAGE OF DIRECTORY INFORMATION SYSTEM KNOWLEDGE REFERRALS

(75) Inventor: Ajay Keni, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 313 days.

(21) Appl. No.: 11/130,508

(22) Filed: May 16, 2005

(65) Prior Publication Data

US 2006/0047641 A1 Mar. 2, 2006

Related U.S. Application Data

(60) Provisional application No. 60/606,631, filed on Sep. 1, 2004.

(51) Int. Cl.
*G06F 17/30* (2006.01)
(52) U.S. Cl. .............. 707/760; 707/770; 707/E17.032; 707/E17.063; 707/E17.07
(58) Field of Classification Search .............. 707/1, 707/2, 3, 4, 5, 8, 100, 102, 103 R, 104.1; 709/230
See application file for complete search history.

(56) References Cited

U.S. PATENT DOCUMENTS

| | | | | |
|---|---|---|---|---|
| 6,154,743 A * | 11/2000 | Leung et al. | ................. | 1/1 |
| 6,304,974 B1 | 10/2001 | Samar | | |
| 6,347,312 B1 * | 2/2002 | Byrne et al. | ................. | 707/3 |
| 6,356,892 B1 * | 3/2002 | Corn et al. | ................. | 707/3 |
| 6,408,306 B1 * | 6/2002 | Byrne et al. | ............. | 707/104.1 |
| 6,484,177 B1 * | 11/2002 | Van Huben et al. | ......... | 707/10 |
| 6,487,547 B1 | 11/2002 | Ellison et al. | | |
| 6,529,885 B1 | 3/2003 | Johnson | | |
| 6,539,379 B1 * | 3/2003 | Vora et al. | ................. | 707/6 |
| 6,539,382 B1 * | 3/2003 | Byrne et al. | ................. | 707/10 |
| 6,587,856 B1 * | 7/2003 | Srinivasan et al. | .......... | 707/102 |
| 6,601,065 B1 * | 7/2003 | Nelson et al. | ................. | 707/4 |
| 6,609,121 B1 * | 8/2003 | Ambrosini et al. | ............. | 1/1 |
| 6,615,223 B1 | 9/2003 | Shih et al. | | |
| 6,622,170 B1 * | 9/2003 | Harrison et al. | ............. | 709/221 |
| 6,665,674 B1 * | 12/2003 | Buchanan et al. | ............. | 1/1 |
| 6,691,117 B2 | 2/2004 | Ellison et al. | | |
| 6,748,374 B1 * | 6/2004 | Madan et al. | ................. | 707/3 |
| 6,795,830 B1 | 9/2004 | Banerjee et al. | | |
| 6,823,338 B1 * | 11/2004 | Byrne et al. | ................. | 707/9 |
| 6,834,286 B2 | 12/2004 | Srinivasan et al. | | |
| 6,898,577 B1 | 5/2005 | Johnson | | |
| 6,941,282 B1 | 9/2005 | Johnson | | |

(Continued)

OTHER PUBLICATIONS

Setting up LDAP with back-sql, Dec. 19, 2002, <http://web.archive.org/web/20021224171042/http://www.flatmtn.com/computer/Linux-LDAP.html>, pp. 1-9.*

(Continued)

*Primary Examiner*—Pierre M Vital
*Assistant Examiner*—Christopher P Nofal
(74) *Attorney, Agent, or Firm*—Vista IP Law Group, LLP.

(57) ABSTRACT

The method, system and computer program product for efficient retrieval of knowledge referral are disclosed. In one approach, the method, system and computer program product modify a query for retrieving an entry from a directory information system, that is stored in a relational database, to retrieve the entry and a knowledge referral.

21 Claims, 4 Drawing Sheets

U.S. PATENT DOCUMENTS

| | | | |
|---|---|---|---|
| 6,988,102 | B2 | 1/2006 | Rossiter et al. |
| 6,993,657 | B1 | 1/2006 | Renner et al. |
| 7,016,845 | B2 | 3/2006 | Vora et al. |
| 7,035,840 | B2 | 4/2006 | Nakos et al. |
| 7,076,488 | B2* | 7/2006 | Bollich ............................. 1/1 |
| 7,184,995 | B2* | 2/2007 | Kaw et al. ...................... 707/1 |
| 7,313,581 | B1* | 12/2007 | Bachmann et al. .......... 707/206 |
| 2001/0034733 | A1* | 10/2001 | Prompt et al. ............... 707/102 |
| 2002/0129153 | A1* | 9/2002 | Fleming ..................... 709/230 |
| 2002/0138489 | A1* | 9/2002 | Trivedi et al. ................. 707/10 |
| 2003/0115196 | A1* | 6/2003 | Boreham et al. ................ 707/4 |
| 2003/0191739 | A1 | 10/2003 | Chatterjee et al. |
| 2003/0191759 | A1* | 10/2003 | Harvey .......................... 707/4 |
| 2004/0059719 | A1* | 3/2004 | Gupta et al. .................... 707/3 |
| 2004/0111375 | A1 | 6/2004 | Johnson |
| 2004/0153438 | A1 | 8/2004 | Rossiter et al. |
| 2004/0172368 | A1 | 9/2004 | Johnson |
| 2004/0210582 | A1 | 10/2004 | Chatterjee et al. |
| 2004/0243576 | A1* | 12/2004 | Shrivastava et al. ............ 707/5 |
| 2005/0165807 | A1 | 7/2005 | Srinivasan et al. |
| 2005/0190692 | A1 | 9/2005 | Singh et al. |
| 2005/0190755 | A1 | 9/2005 | Singh et al. |
| 2005/0222963 | A1 | 10/2005 | Johnson |
| 2005/0257211 | A1 | 11/2005 | Chatterjee et al. |
| 2005/0278384 | A1 | 12/2005 | Lin et al. |
| 2005/0289174 | A1 | 12/2005 | Kolli et al. |
| 2005/0289342 | A1 | 12/2005 | Needham et al. |
| 2006/0004779 | A1 | 1/2006 | Rossiter et al. |
| 2006/0047641 | A1 | 3/2006 | Keni |
| 2006/0059539 | A1 | 3/2006 | Shashikumar et al. |
| 2006/0085443 | A1 | 4/2006 | Pae et al. |
| 2006/0123024 | A1* | 6/2006 | Sathyanarayan et al. .... 707/100 |
| 2006/0149760 | A1* | 7/2006 | Keni et al. ................. 707/100 |
| 2007/0073703 | A1* | 3/2007 | Quin ........................... 707/10 |
| 2009/0063505 | A1* | 3/2009 | Kinder ........................ 707/10 |

OTHER PUBLICATIONS

Back-sql Concept Doc, Oct. 25, 2000, <http://folk.uio.no/hbf/OpenLDAP/back-doc.txt>, pp. 50-58.*

How do I setup/configure back-sql?, Apr. 27, 2004, OpenLDAP Foundction, <http://web.archive.org/web/20040427055212/http://www.openldap.org/faq/data/cache/978.html>, pp. 1-3.*

Furuseth, Hallvard, B., "Backend documentation patch," Jun. 2, 2002, University of Oslo, version 1, pp. 1-58.*

"Using OpenLDAP with multiple servers to authenticate", Oct. 9, 2001, openLDAP.org, pp. 1-4.*

Furuseth, Hallvard, B., "Backend documentation patch," Jun. 2, 2002, University of Oslo, version 1, unnumbered pp. 1-67.*

Chadwick, D., "*Deficiencies in LDAP When Used to Support PKI*", Communications of the ACM, Mar. 2003, vol. 46 No. 3, pp. 99-104, ACM Press, USA.

Defude, B., "*Knowledge Based Systems Versus Thesaurus: An Architecture Problem About Expert Systems Design*", Proceedings of the 7th Annual International ACM SIGIR Conference on Research and Development in Information Retrieval, Jul. 1984, pp. 267-280, British Computer Society, UK.

Hull, R. et al., "*Semantic Database Modeling: Survey, Applications, and Research Issues*", ACM Computing Surveys (CSUR), Sep. 1987, vol. 19 Issue 3, pp. 201-260, ACM Press, USA.

Katz, B. et al., "*Gathering Knowledge for a Question Answering System From Heterogeneous Information Sources*", Proceedings of the Workshop on Human Language Technology Technology and Knowledge Management, Jul. 2001, pp. 1-8, vol. 2001, Association for Computer Linguistics, USA.

Maass, H., "*Location-Aware Mobile Applications Based on Directory Services*", Mobile Networks and Applications 3, Aug. 1998, pp. 157-173, vol. 3 Issue 2, Kluwer Academic Publishers, Germany.

Vanthournout, V. et al., "*A Taxonomy for Resource Discovery*", Personal and Ubiquitous Computing, Mar. 2005, pp. 81-89, vol. 9 Issue 2, Springer-Verlag London Limited, UK.

Winters, G. et al., "Managing Heterogeneous Distributed Computing Systems: Using Information Repositories", Proceedings of the 1993 Conference of the Centre for Advanced Studies on Collaborative Research: Distribued Computing, Oct. 1993, pp. 691-706, vol. 2, IBM Press, USA.

Cluet, S. et al. "Using LDAP Directory Caches" Proceedings of the 18th ACM SIGMOD-SIGACT-SIGART Symposium on Principles of Database Systems (PODS '99), Philadelphia, PA, May 1999, pp. 273-284.

* cited by examiner

EFFICIENT RETRIEVAL AND STORAGE OF DIRECTORY INFORMATION SYSTEM KNOWLEDGE REFERRALS

CROSS-REFERENCE TO RELATED APPLICATIONS

This application claims the benefit of U.S. Provisional Application No. 60/606,631 filed on Sep. 1, 2004, which is hereby incorporated by reference as if fully set forth herein.

FIELD OF THE INVENTION

The present invention is related to the storage of data within database systems. More particularly, the present invention is directed to the storage and access of object-oriented entities within a relational database management system.

BACKGROUND

Many computer programming languages and applications utilize object-oriented structures to model real world information. Object-oriented languages and applications access and store data in the form of entities such as objects and attributes. For example, many conventional applications used for querying and maintaining directory information systems are modeled using aspects of object-oriented techniques and entities. Directory information systems provide a framework for the storage and retrieval of information that are used to identify and locate the details of individuals and organizations, such as telephone numbers, postal addresses, and email addresses.

One common type of object-oriented based directory systems is a directory based on the Lightweight Directory Access Protocol ("LDAP"). LDAP is a directory protocol that was developed at the University of Michigan, originally as a front end to access directory systems organized under the X.500 standard for open electronic directories. Standalone LDAP server implementations are now commonly available to store and maintain directory information.

LDAP Knowledge References, also called knowledge referral entries or referrals, are Directory entries that can be used to contain remote Directory Server and Directory Information Tree (DIT) information. For example, since it is possible to partition the Directory content. (DIT and entries) among multiple Directory servers, each Directory server in the partition group maintains a referral entry that points to the other Directory servers for relevant partitions of the DIT.

When the LDAP Directory Server services an LDAP Search request from a client, the knowledge referral entries that are relevant to the search scope can be returned as part of the search result set. There are two main portions of the LDAP Search request that determine the search result set, the base and the filter. The base of the search specifies the root of the hierarchical DIT for this search. The filter specifies the Attribute Value Assertions, which, if satisfied, places the entry in the result set.

For example, in a search for an individual named John Doe in the payroll organizational unit of Acme company, the base may look like base="ou=payroll,o=acme.com" and the filter may look like filter="uid=jdoe". There is a need for the Directory Server to return not only the entries that have a user ID (UID) value of 'jdoe' but also the referral entries that are present in the DIT under the specified base.

Currently there exists no mechanism to represent and obtain both directory entry data and knowledge referral data from a relational database system. There is a need for a mechanism to represent and obtain both LDAP entry and LDAP referral information from a relational database system.

BRIEF SUMMARY OF THE INVENTION

A method, system, and computer program for Relational Schema Definition And Query Methodology For Efficient Retrieval Of LDAP Knowledge Referrals includes representing the referral in a relational schema and automatically modifying the query to retrieve the referral.

DETAILED DESCRIPTION

Figure 1:
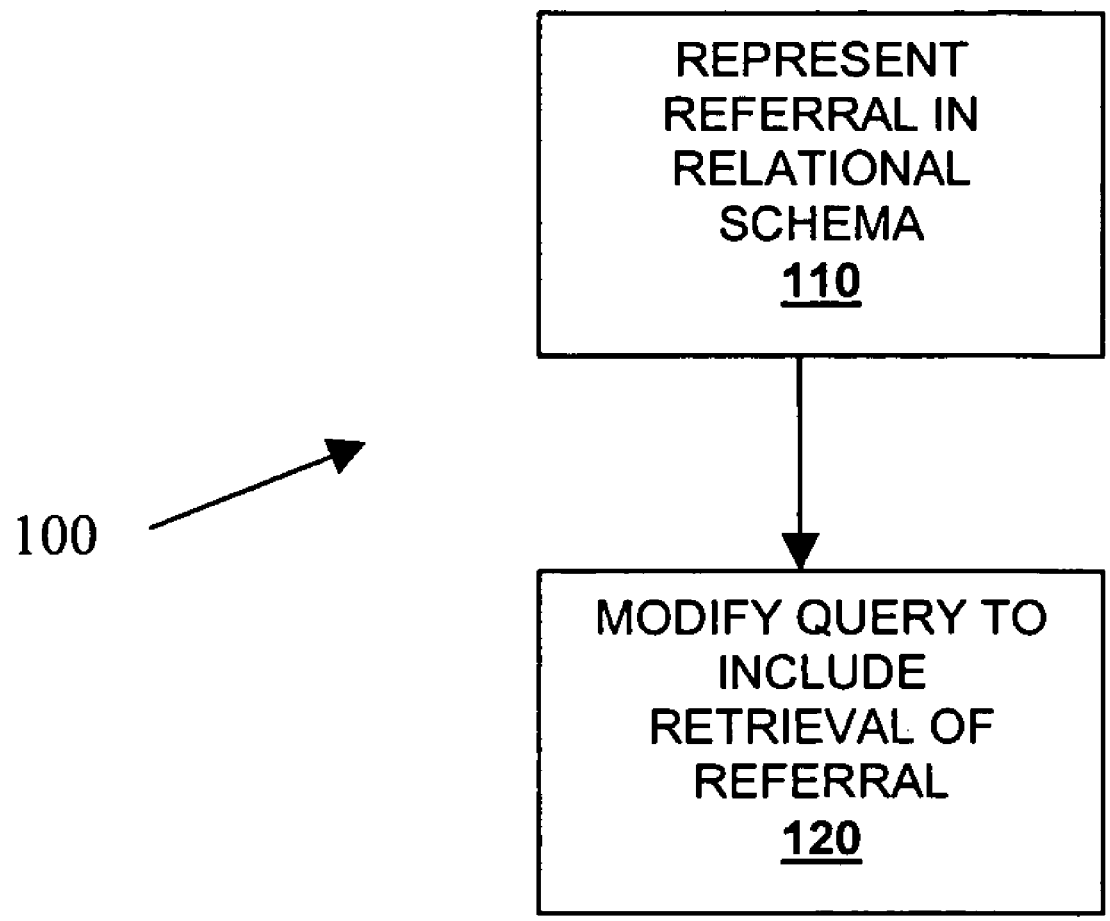
FIG. 1 is a representation of an embodiment of process 100 which is an overview of a method for relational schema definition and query methodology for efficient retrieval of LDAP knowledge referrals.

As mentioned above a method, system, and computer program for relational schema definition and query methodology for efficient retrieval of LDAP knowledge referrals is described in this disclosure. FIG. 1 is a representation of an embodiment of a method of relational schema definition and query methodology for efficient retrieval of LDAP knowledge referrals. The method includes representing the referral in a relational schema, 110 and automatically modifying the query to retrieve the referral, 120.

In one embodiment, the LDAP attributes that are 'searchable' are cataloged in relational tables. An example approach to implement relational schema storage structures for this information is described in U.S. Pat. No. 6,587,856, which is incorporated herein by reference in its entirety.

For example, the catalog table for the attribute user ID (UID) ct_UID(entryid,attrval,stype) holds the unique entryID and UID value information. The relational tables can also hold the referral information. When a Knowledge Referral entry is provisioned in a LDAP server's relational store, its presence is reflected in every catalog table.

Figure 2:
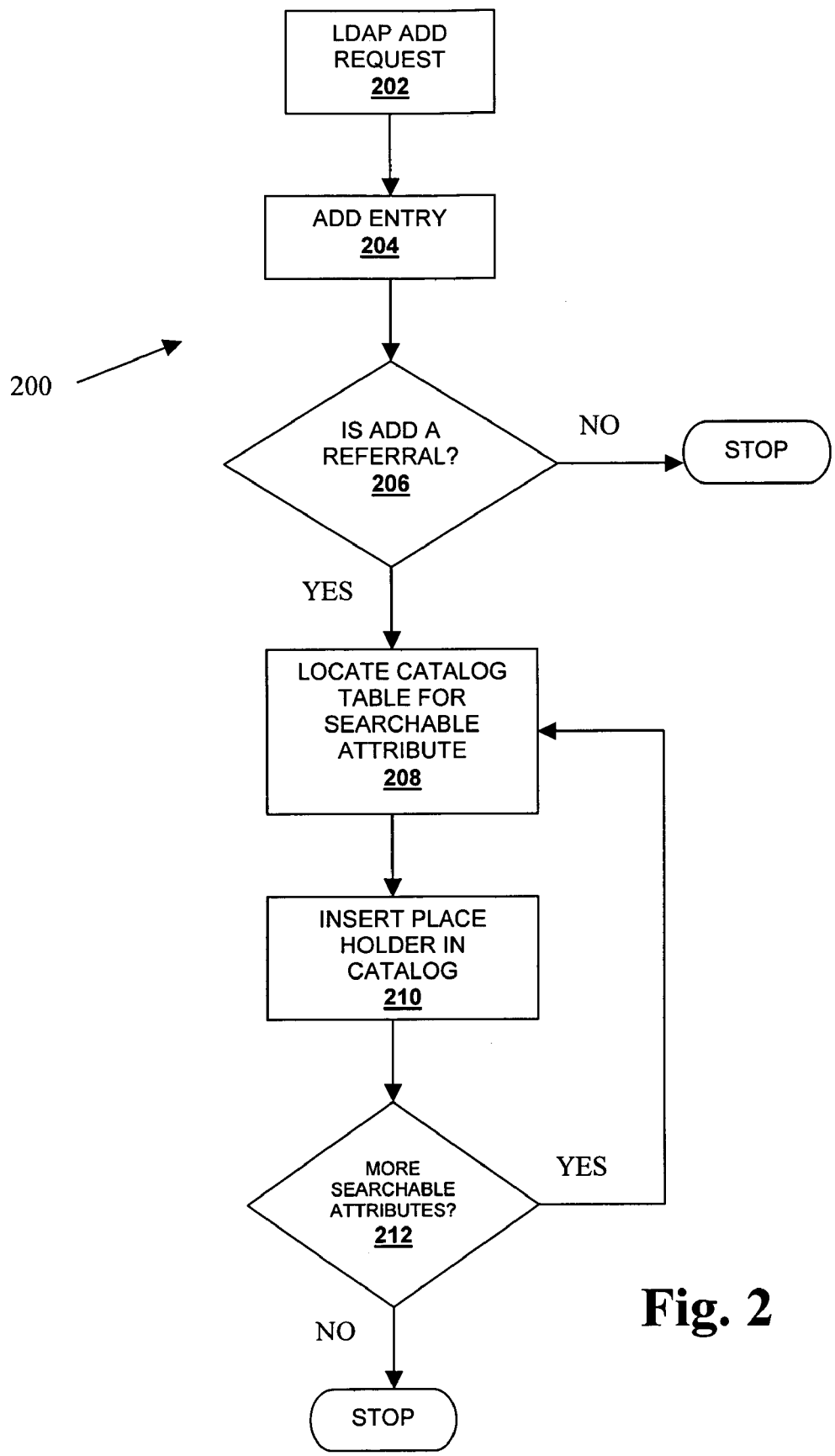
FIG. 2 is a representation of an embodiment of process 200 which is the method of representing a referral in a relational schema.

For example, process 200 shown in FIG. 2 shows an embodiment of a method to represent the referral in a relational schema. An LDAP add request is received, 202. The entry is added according to the request, 204. The process determines if the request included a Knowledge Referral, 206. If not the process stops. If yes, the catalog table is located for one of the searchable attributes of the entry, 208. A place holder is inserted in the catalog table, 210. The process determines if there are more searchable attributes for the base, 212. If no, the process stops. If yes, the process loops back and locates the catalog table for the next searchable attribute for that base, 208.

For example, if a referral entry was assigned an entryid "4200", then a place holder such as the value (4200, 'oidrefmgc2004',NULL) is inserted into a row in every catalog table. This place holder indicates that there is an associated Knowledge Referral.

To retrieve the Knowledge Referral transparently with the entries, the entry request is automatically modified. A single sub-query approach is used. One embodiment has a defined set of rules to map the incoming hierarchical LDAP lookup to relational Query. General solutions to perform this mapping are disclosed in U.S. application Ser. No. 10/449,946, filed May 30, 2003 and U.S. Pat. No. 6,748,374, which are hereby incorporated by reference in their entirety.

Figure 3:
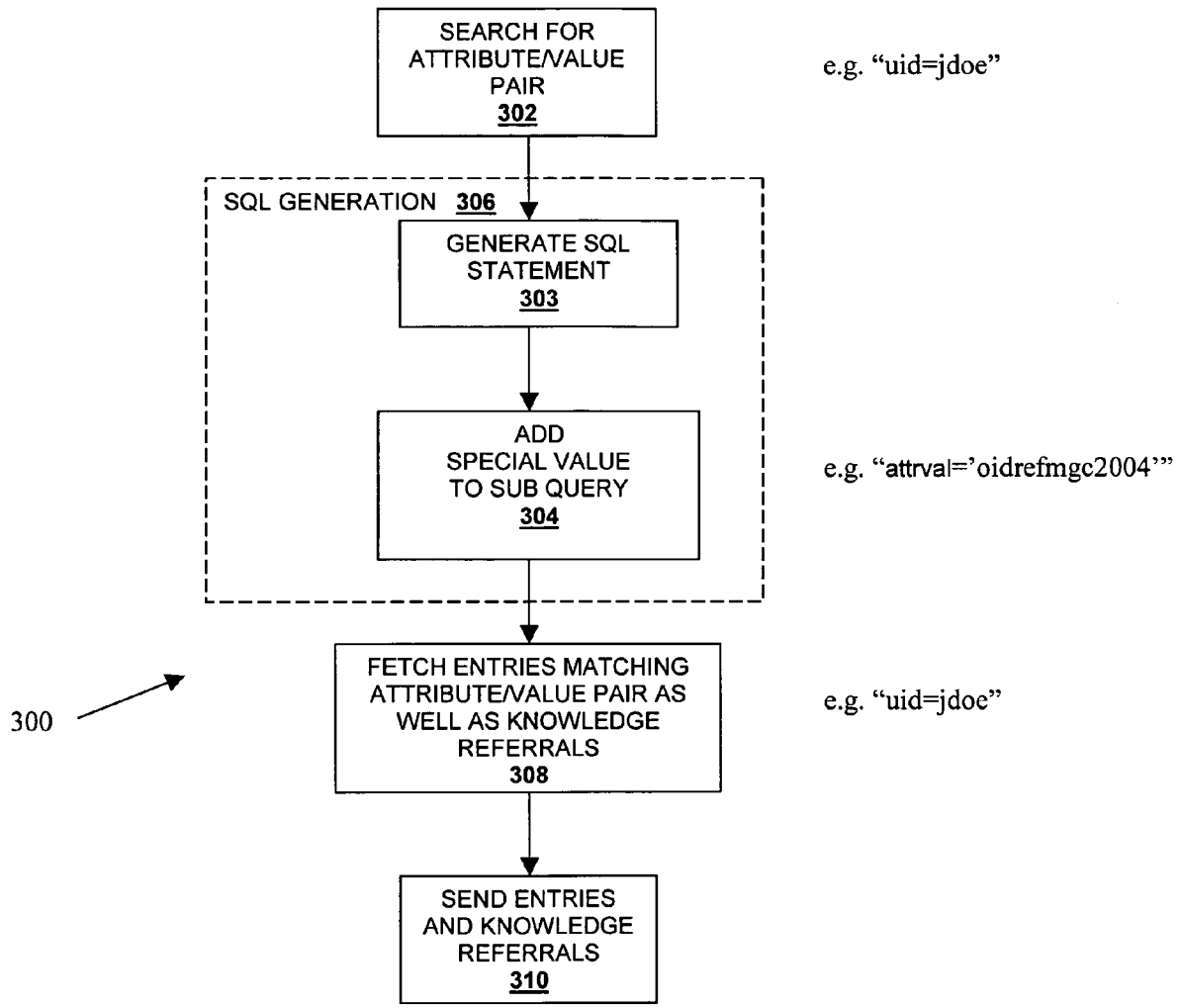
FIG. 3 is a representation of an embodiment of process 300 which is the method of query modification to retrieve referrals.

In some embodiments, a special value is added to a sub query. This is shown in process 300 illustrated in FIG. 3. A search for an attribute/value pair is conducted, 302. For example, the attribute/value pair may be "uidjdoe". A database query language statement (e.g., SQL) generation occurs, 306. Within SQL generation, 306, the SQL statement from the original entry request is created, 304; and a special value is added to the query, 304. For example, the special value, or special attribute/value pair, "OR attrval='oidrefmgc2004'"

is added to the assertion in the search request. This ensures the fetching of the entryids of referral entries (if any) along with the entryids of the entries matching the search filter (if any), 308. The entries and knowledge Referrals are sent to requestor, 310.

In the above LDAP Search example, the filter "UID=jdoe" originally would have resulted in the following sub-query (303):

(SELECT at1.entryid FROM ct_uid at1 WHERE at1.attrval='jdoe').

In some embodiments, to ensure the retrieval of Knowledge Referral, the modified sub-query (304) will be:

(SELECT at1.entryid FROM ct_uid at1 WHERE at1.attrval='jdoe' OR attrval='oidrefmgc2004').

This technique can be applied to retrieval of LDAP Alias objects as well.

System Architecture Overview

Figure 4:
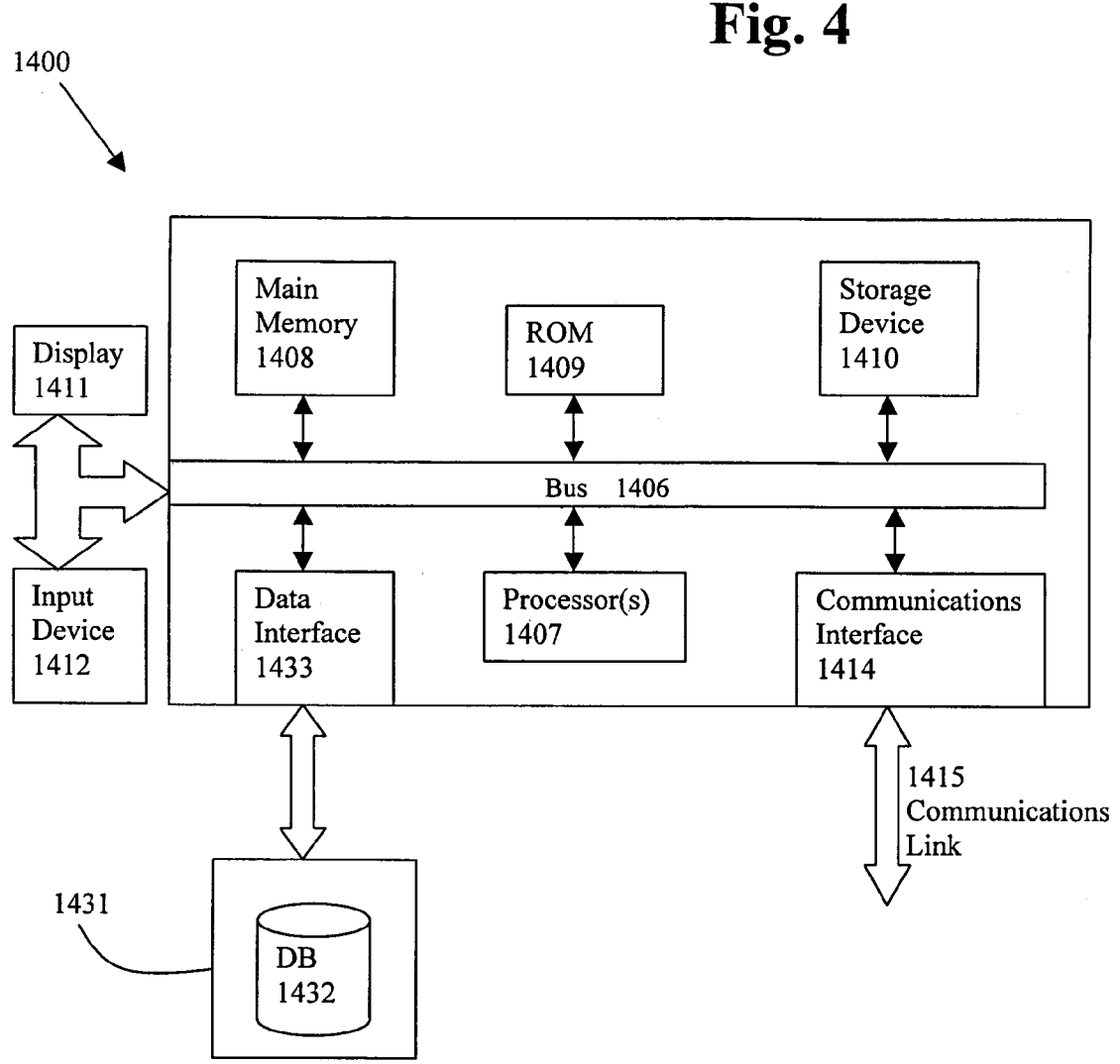
FIG. 4 is a representation of a system that can provide a method for relational schema definition and query methodology for efficient retrieval of LDAP knowledge referrals.

The execution of the sequences of instructions required to practice the embodiments may be performed by a computer system 1400 as shown in FIG. 4. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 4, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed is:

1. A computer-implemented method for efficient retrieval of a knowledge reference, comprising:
  receiving a query for retrieving an entry from a directory information system, wherein the entry from the directory information system is represented in a relational database;
  modifying the query, by using a processor, to retrieve the entry and a representation of the knowledge reference from the directory information system, wherein the representation of the knowledge reference is in the relational database, wherein modifying the query comprises: receiving a request for a first attribute value pair; generating a database query statement to search for the first attribute value pair; and inserting an OR operator and a second attribute value pair in the database query statement, wherein the second attribute value pair includes the knowledge reference attribute and attribute value;
  retrieving the entry and the representation of the knowledge reference in the relational database, wherein the representation of the knowledge reference comprises remote directory server information for a partition of a directory information tree, wherein the directory information system content is partitioned among multiple directory servers;
  responding to the query for retrieving the entry from the relational database with the entry and the knowledge reference from the relational database;
  locating one or more catalog tables in the relational database for one or more searchable attributes in the directory information system;
  inserting a place holder in the one or more catalog tables for the knowledge reference; and
  displaying the entry and the knowledge reference on a display device or storing the entry and the knowledge reference in a volatile or non-volatile computer-usable medium.

2. The method of claim 1, wherein the knowledge reference is assigned an identifier.

3. The method of claim 2, wherein the placeholder includes the knowledge reference identifier.

4. The method of claim 3, wherein the placeholder further includes an attribute value and a type.

5. A system comprising:
  a processor for:
  receiving a query for retrieving an entry from a directory information system, wherein the entry from the directory information system is represented in a relational database;
  modifying the query to retrieve the entry and a representation of a knowledge reference from a directory information system, wherein the representation of the knowledge reference is in the relational database, wherein modifying the query comprises: receiving a request for a first attribute value pair; generating a database query statement to search for the first attribute value pair; and inserting an OR operator and a second attribute value pair in the database query statement, wherein the second attribute value pair includes the knowledge reference attribute and attribute value;
  retrieving the entry and the representation of the knowledge reference in the relational database, wherein the representation of the knowledge reference comprises remote directory server information for a partition of a directory information tree, wherein the directory information system content is partitioned among multiple directory servers;
  responding to the query for retrieving the entry from the relational database with the entry and the knowledge reference from the relational database;
  locating one or more catalog tables in the relational database for one or more searchable attributes in the directory information system;
  inserting a place holder in the one or more catalog tables for the knowledge reference; and
  a volatile or non-volatile computer-usable medium for storing the entry and the knowledge reference or a display device for displaying the entry and the knowledge reference.

6. The system of claim 5 wherein the knowledge reference is assigned an identifier.

7. The system of claim 6, wherein the placeholder includes the knowledge reference identifier.

8. The system of claim 7, wherein the placeholder further includes an attribute value and a type.

9. A computer program product embodied on a volatile or non-volatile computer-usable medium, the computer-usable medium having stored thereon a sequence of instructions which, when executed by a processor, causes the processor to execute a method for relational schema definition and retrieval a knowledge reference, the method comprising:
  receiving a query for retrieving an entry from a directory information system, wherein the entry from the directory information system is represented in a relational database;
  modifying the query to retrieve the entry and a representation of the knowledge reference from the directory information system, wherein the representation of the knowledge reference is in the relational database, wherein modifying the query comprises: receiving a request for a first attribute value pair; generating a database query statement to search for the first attribute value pair; and inserting an OR operator and a second attribute value pair in the database query statement, wherein the second attribute value pair includes the knowledge reference attribute and attribute value;
  retrieving the entry and the representation of the knowledge reference in the relational database, wherein the representation of the knowledge reference comprises remote directory server information for a partition of a directory information tree, wherein the directory information system content is partitioned among multiple directory servers;

responding to the query for retrieving the entry from the relational database with the entry and the knowledge reference from the relational database;

locating one or more catalog tables in the relational database for one or more searchable attributes in the directory information system; and inserting a place holder in the one or more catalog tables for the knowledge reference.

10. The computer program product of claim 9, wherein the knowledge reference is assigned an identifier.

11. The computer program product of claim 10, wherein the placeholder includes the knowledge reference identifier.

12. The computer program product of claim 11, wherein the placeholder further includes an attribute value and a type.

13. A computer-implemented method to store a knowledge reference for retrieval, comprising:

receiving a storage request to store an entry of a directory information system in a relational database;

storing the entry in the relational database in a volatile or non-volatile computer-usable medium;

locating one or more catalog tables in the relational database for one or more searchable attributes in the directory information system;

inserting a place holder in the one or more catalog tables for the knowledge reference; and upon receipt of the request to store the entry, associating, by using a processor, a knowledge reference with the entry in the relational database in the volatile or non-volatile computer-usable medium, wherein the entry and the knowledge reference are retrieved from the relational database by a retrieval request to retrieve the entry from the relational database, wherein the retrieval request is modified by receiving a request for a first attribute value pair, generating a database query statement to search for the first attribute value pair, and inserting an OR operator and a second attribute value pair in the database query statement, wherein the second attribute value pair includes the knowledge reference attribute and attribute value.

14. The method of claim 13, wherein the placeholder comprises an attribute value and a type.

15. The method of claim 13, wherein the knowledge reference is assigned an identifier.

16. A computer program product embodied on a volatile and non-volatile computer-usable medium, the computer-usable medium having stored thereon a sequence of instructions which, when executed by a processor, causes the processor to execute a method for storing a knowledge reference for retrieval, the method comprising:

receiving a storage request to store an entry of a directory information system in a relational database;

storing the entry in the relational database;

locating one or more catalog tables in the relational database for one or more searchable attributes in the directory information system;

inserting a place holder in the one or more catalog tables for the knowledge reference; and upon receipt of the request to store the entry, associating a knowledge reference with the entry in the relational database, wherein the entry and the knowledge reference are retrieved from the relational database by a retrieval request to retrieve the entry from the relational database, wherein the retrieval request is modified by receiving a request for a first attribute value pair, generating a database query statement to search for the first attribute value pair, and inserting an OR operator and a second attribute value pair in the database query statement, wherein the second attribute value pair includes the knowledge reference attribute and attribute value.

17. The product of claim 16, wherein the placeholder comprises an attribute value and a type.

18. The product of claim 16, wherein the knowledge reference is assigned an identifier.

19. A system for storing a knowledge reference for retrieval, comprising:

a receiver for receiving a storage request to store an entry of a directory information system in a relational database;

a volatile or non-volatile computer-usable medium for storing the entry in the relational database; and a processor for:

locating one or more catalog tables in the relational database for one or more searchable attributes in the directory information system;

inserting a place holder in the one or more catalog tables for the knowledge reference; and upon receipt of the request to store the entry, a processor for associating a knowledge reference with the entry in the relational database in the volatile or non-volatile computer-usable medium, wherein the entry and the knowledge reference are retrieved from the relational database by a retrieval request to retrieve the entry from the relational database, wherein the retrieval request is modified by receiving a request for a first attribute value pair, generating a database query statement to search for the first attribute value pair, and inserting an OR operator and a second attribute value pair in the database query statement, wherein the second attribute value pair includes the knowledge reference attribute and attribute value.

20. The system of claim 19, wherein the placeholder comprises an attribute value and a type.

21. The system of claim 19, wherein the knowledge reference is assigned an identifier.

* * * * *

UNITED STATES PATENT AND TRADEMARK OFFICE
CERTIFICATE OF CORRECTION

PATENT NO. : 7,779,022 B2  
APPLICATION NO. : 11/130508  
DATED : August 17, 2010  
INVENTOR(S) : Ajay Keni Page 1 of 1

It is certified that error appears in the above-identified patent and that said Letters Patent is hereby corrected as shown below:

On the title page, item [56]:
On page 2, in column 2, under "Other Publications," line 2, delete "Foundction," and insert -- Foundation, --, therefor.

On page 2, in column 2, under "Other Publications", line 23, delete "Technology Technology" and insert -- Technology --, therefor.

On page 2, in column 2, under "Other Publications", line 35, delete "Distribued" and insert -- Distributed --, therefor.

In column 1, line 45, delete "content." and insert -- content --, therefor.

In column 3, line 12, delete "uidjdoe"." and insert -- uid=jdoe". --, therefor.

In column 6, line 50, in claim 9, delete "a" and insert -- of a --, therefor.

Signed and Sealed this
Seventeenth Day of May, 2011

David J. Kappos
*Director of the United States Patent and Trademark Office*